(12) United States Patent
Shearer et al.

(10) Patent No.: US 9,046,899 B2
(45) Date of Patent: Jun. 2, 2015

(54) AIRCRAFT HEATING SYSTEM

(71) Applicant: Goodrich Corporation, Charlotte, NC (US)

(72) Inventors: Jon D. Shearer, Hartville, OH (US); Carl R. Aeshliman, Rittman, OH (US)

(73) Assignee: GOODRICH CORPORATION, Charlotte, NC (US)

( * ) Notice: Subject to any disclaimer, the term of this patent is extended or adjusted under 35 U.S.C. 154(b) by 0 days.

(21) Appl. No.: 13/661,959

(22) Filed: Oct. 26, 2012

(65) Prior Publication Data

US 2014/0332521 A1 Nov. 13, 2014

Related U.S. Application Data

(60) Provisional application No. 61/553,965, filed on Nov. 1, 2011.

(51) Int. Cl.
| | |
|---|---|
| *H05B 1/02* | (2006.01) |
| *G05D 23/19* | (2006.01) |
| *G05D 23/24* | (2006.01) |
| *B64D 13/08* | (2006.01) |
| *B64D 15/12* | (2006.01) |
| *B64D 37/34* | (2006.01) |

(52) U.S. Cl.
CPC ............ *G05D 23/1917* (2013.01); *G05D 23/24* (2013.01); *B64D 13/08* (2013.01); *B64D 15/12* (2013.01); *B64D 37/34* (2013.01)

(58) Field of Classification Search
CPC .... G05D 23/1917; B64D 13/08; B64D 15/12; H05B 1/02; H05B 1/0236; H05B 1/0202
USPC ......... 219/486, 202, 203, 497, 501, 494, 481; 244/134 D
See application file for complete search history.

(56) References Cited

U.S. PATENT DOCUMENTS

| | | | |
|---|---|---|---|
| 3,456,455 A | 7/1969 | Said | |
| 4,282,423 A | 8/1981 | Volz | |
| 4,365,167 A | 12/1982 | Weimer et al. | |
| 4,455,509 A * | 6/1984 | Crum et al. | 315/119 |
| 4,776,514 A | 10/1988 | Johnstone et al. | |
| 5,063,836 A | 11/1991 | Patel | |
| 5,229,579 A * | 7/1993 | Ingraham et al. | 219/202 |
| 5,351,162 A | 9/1994 | Koishikawa | |
| 5,592,989 A | 1/1997 | Lynn et al. | |

(Continued)

FOREIGN PATENT DOCUMENTS

DE 2443224 A1 3/1976

OTHER PUBLICATIONS

European Search Report for Application No. 12190737.2-1802 Mailed Apr. 19, 2013 4 pages.

*Primary Examiner* — Mark Paschall
(74) *Attorney, Agent, or Firm* — Cantor Colburn LLP

(57) ABSTRACT

An aircraft heating system (100) is provided which can be supplied with DC power from an onboard source (130). The system (100) comprises a heater (150) positioned to provide heat to an aircraft appliance (101), a sensor (160) situated to sense appliance-relevant temperatures, a reporter (170) reporting system faults, and an introducer (180) introducing temperature setpoints. A thermostat (200) integrates circuitries which together manage power supply, control heating, convey sensed temperatures, detect heater and/or sensor faults, and/or perform other advantageous functions.

20 Claims, 11 Drawing Sheets

(56) References Cited

U.S. PATENT DOCUMENTS

| | | | |
|---|---|---|---|
| 5,765,994 A | 6/1998 | Barbier | |
| 5,861,610 A * | 1/1999 | Weiss | 219/497 |
| 5,866,880 A | 2/1999 | Seitz et al. | |
| 5,924,486 A | 7/1999 | Ehlers et al. | |
| 6,006,996 A | 12/1999 | Bhatnagar | |
| 6,049,658 A | 4/2000 | Schave et al. | |
| 6,080,971 A | 6/2000 | Seitz et al. | |
| 6,134,134 A | 10/2000 | Dushane et al. | |
| 6,218,647 B1 | 4/2001 | Jones | |
| 6,336,593 B1 | 1/2002 | Bhatnagar | |
| 6,396,032 B1 | 5/2002 | Denny et al. | |
| 6,466,024 B1 | 10/2002 | Rogers | |
| 6,691,923 B2 * | 2/2004 | Shearer | 236/78 R |
| 6,998,584 B1 | 2/2006 | Luo | |
| 7,006,900 B2 | 2/2006 | Zhenduo et al. | |
| 7,104,462 B2 * | 9/2006 | Shearer | 236/94 |
| 7,346,468 B2 | 3/2008 | Bashor et al. | |
| 7,374,598 B2 * | 5/2008 | Forbes Jones et al. | 75/336 |
| 7,524,107 B1 | 4/2009 | Lorenz | |
| 7,557,330 B2 | 7/2009 | Shearer | |
| 7,583,130 B2 | 9/2009 | Meany | |
| 7,737,762 B2 * | 6/2010 | Deligiannis | 327/427 |
| 8,003,922 B2 | 8/2011 | Seger | |
| 8,097,835 B2 | 1/2012 | Hsieh | |
| 2004/0035197 A1 * | 2/2004 | D'Antonio et al. | 73/149 |
| 2008/0046129 A1 | 2/2008 | Fennewald et al. | |
| 2010/0202794 A1 * | 8/2010 | Kosaka et al. | 399/88 |
| 2011/0192830 A1 | 8/2011 | Wilson | |

* cited by examiner

FIG. 2

| FIG. 2A |
|---|
| FIG. 2B |

AIRCRAFT HEATING SYSTEM

RELATED APPLICATION

This application claims priority under 35 U.S.C. §119(e) to U.S. Provisional Patent Application No. 61/553,965 filed on Nov. 1, 2011. The entire disclosure of this provisional patent application is hereby incorporated by reference.

BACKGROUND

An aircraft will commonly include appliances (e.g., deicers, floor panels, drainmasts, hoses, washer-water dispensers, hot-beverage makers, etc.) which require heating during flight. A typical aircraft heating system comprises a heater which converts electrical power into heat. The electrical power used for this conversion is supplied from a source onboard the aircraft.

SUMMARY

An aircraft heating system is provided which can be used with an onboard DC power source. This DC-powered system can be constructed so as to offer the same operational advantages as those of its AC-generator-powered siblings (see e.g., U.S. Pat. No. 7,104,462).

DRAWINGS

FIG. 1 shows an aircraft heating system powered by an onboard power source comprising a DC generator.

FIG. 2A and FIG. 2B (collectively referred to as FIG. 2) is a diagram of the electrical circuit of the aircraft heating system.

DESCRIPTION

Figure 1:
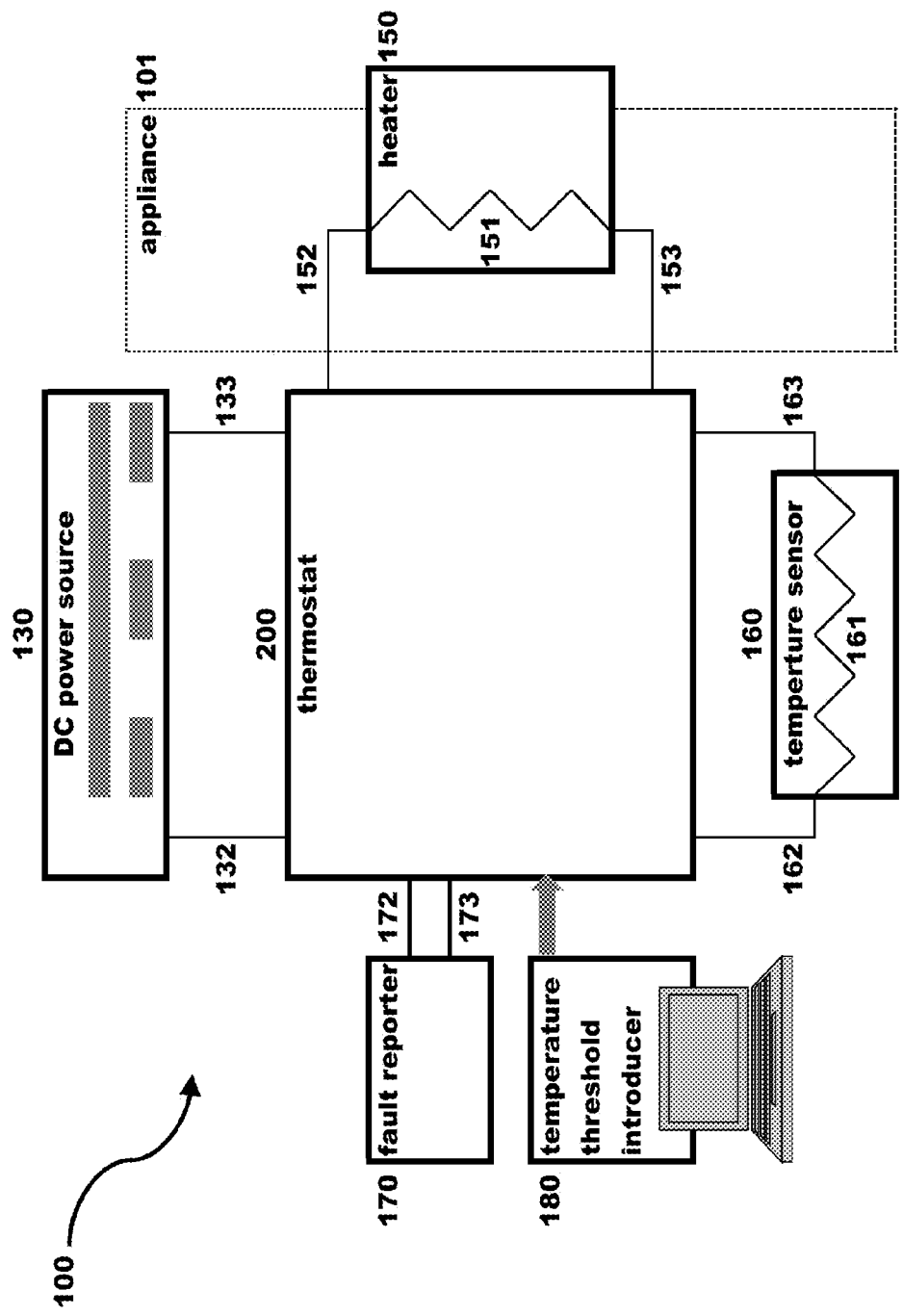
Figure 2A:
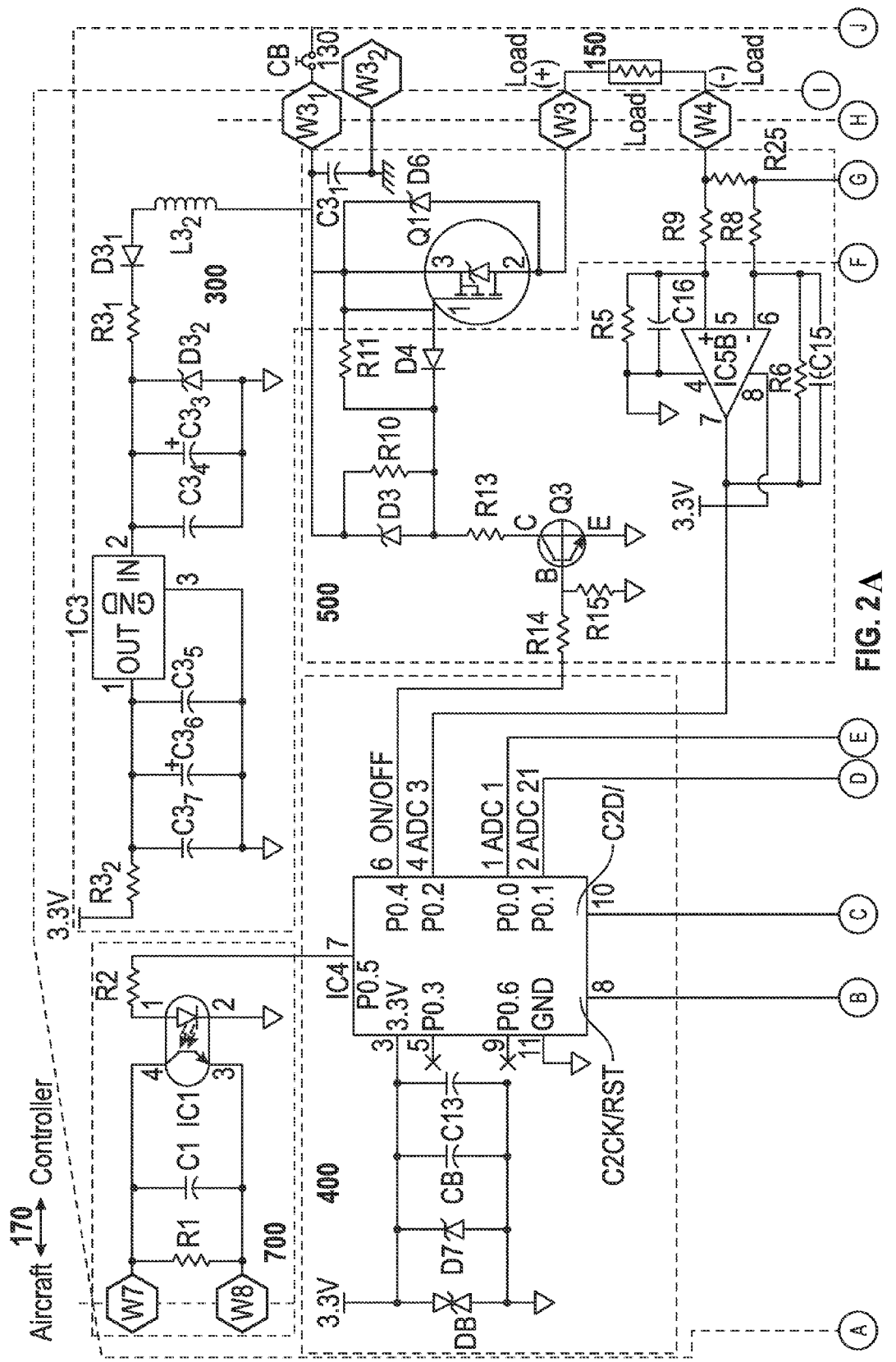
Figure 2:
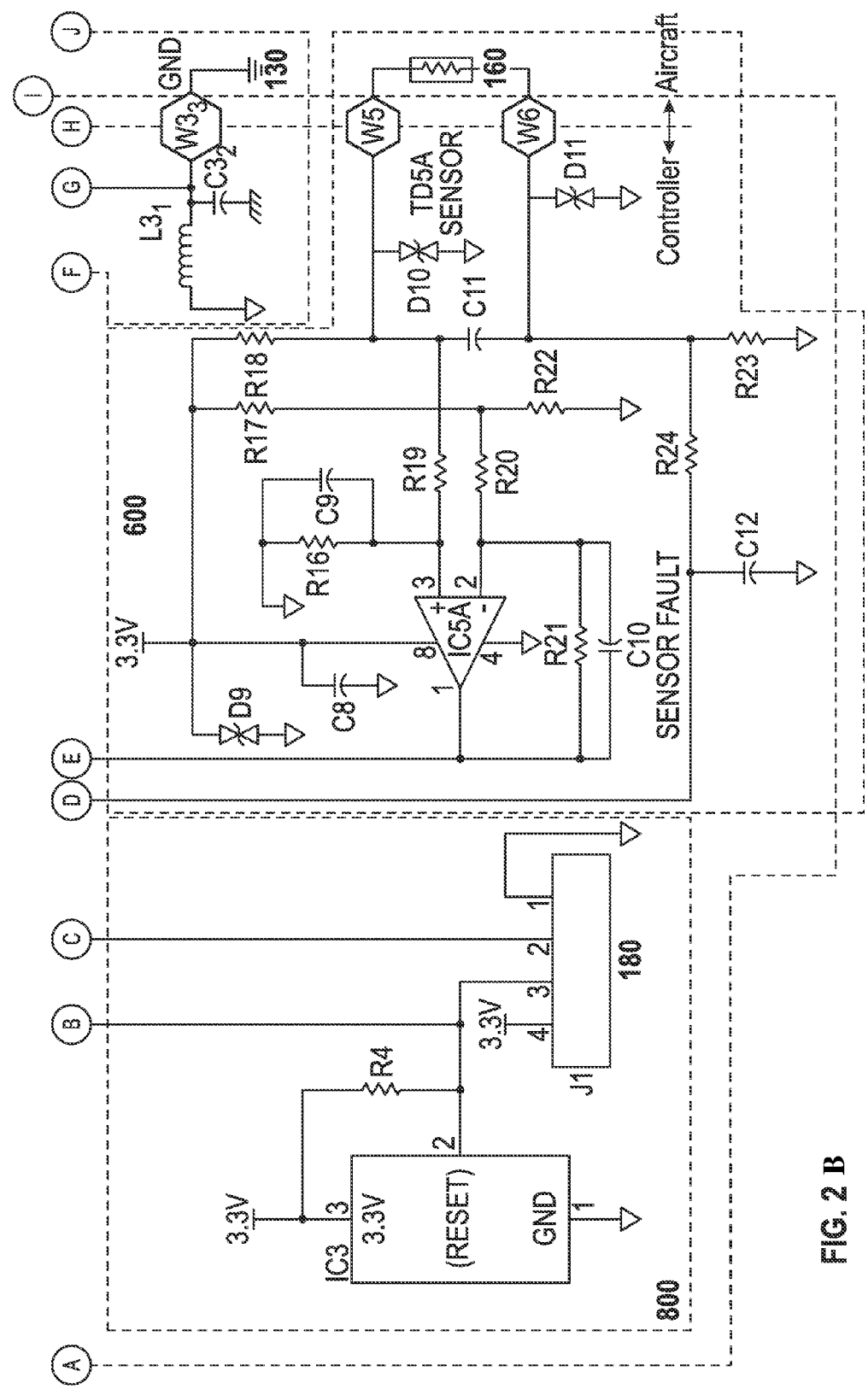
Figure 3:
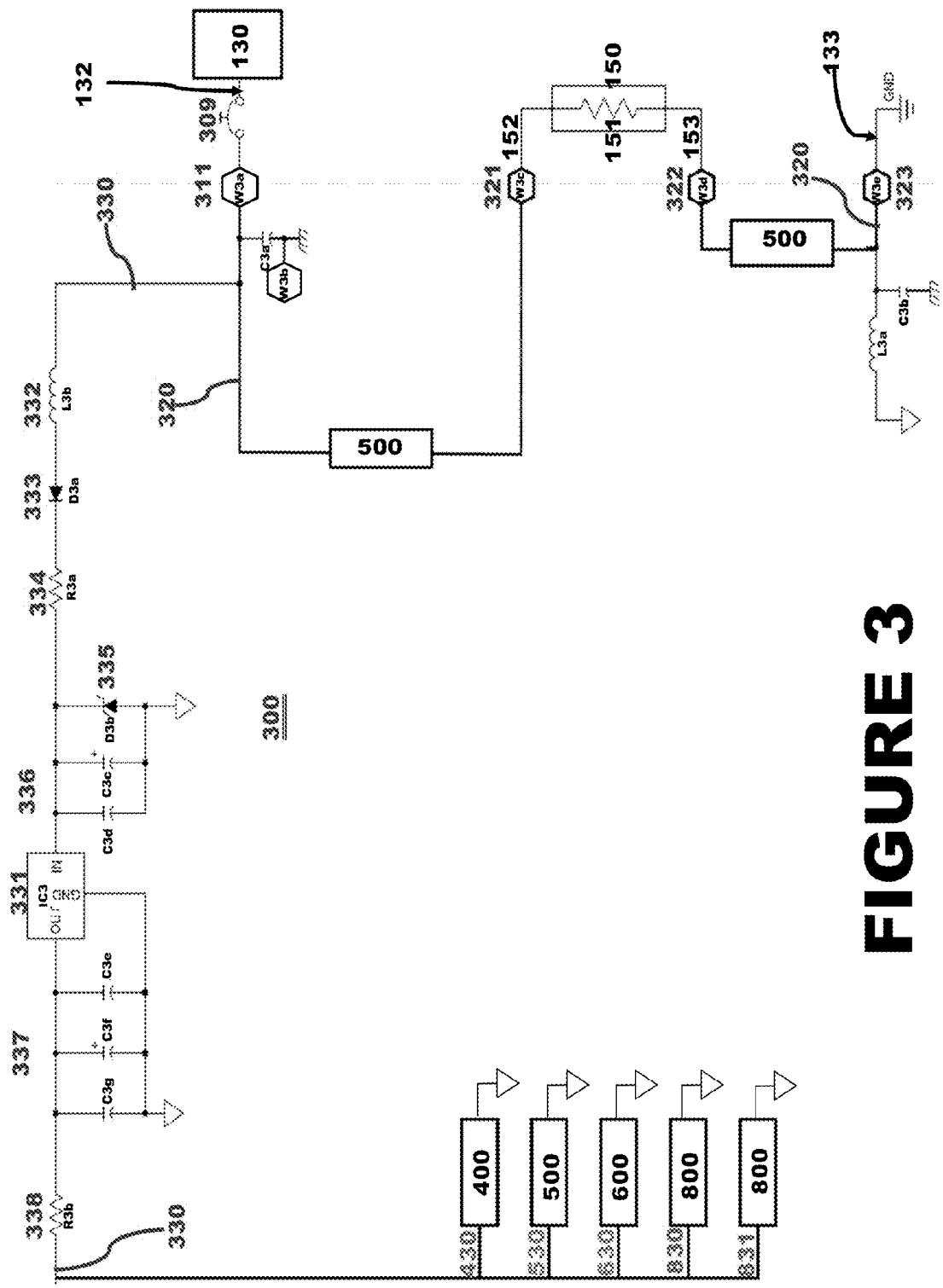
FIGS. 3-8 are more detailed diagram views of certain circuitries in the electrical circuit.
Figure 4:
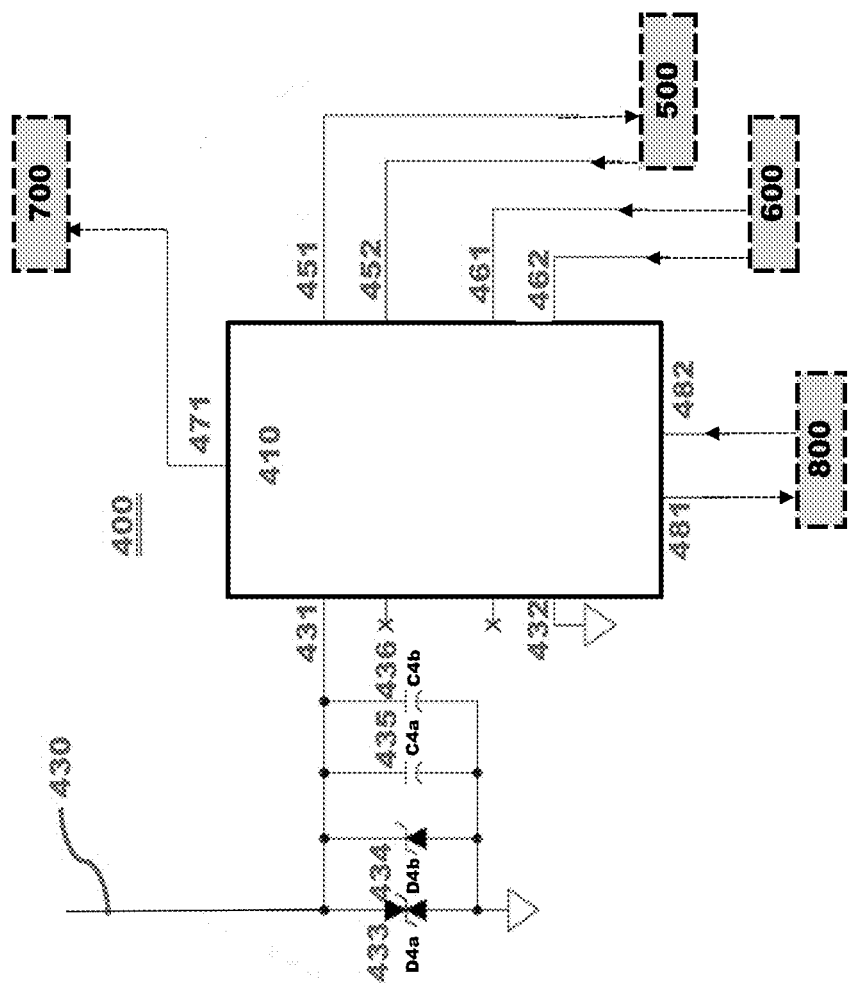
Figure 5:
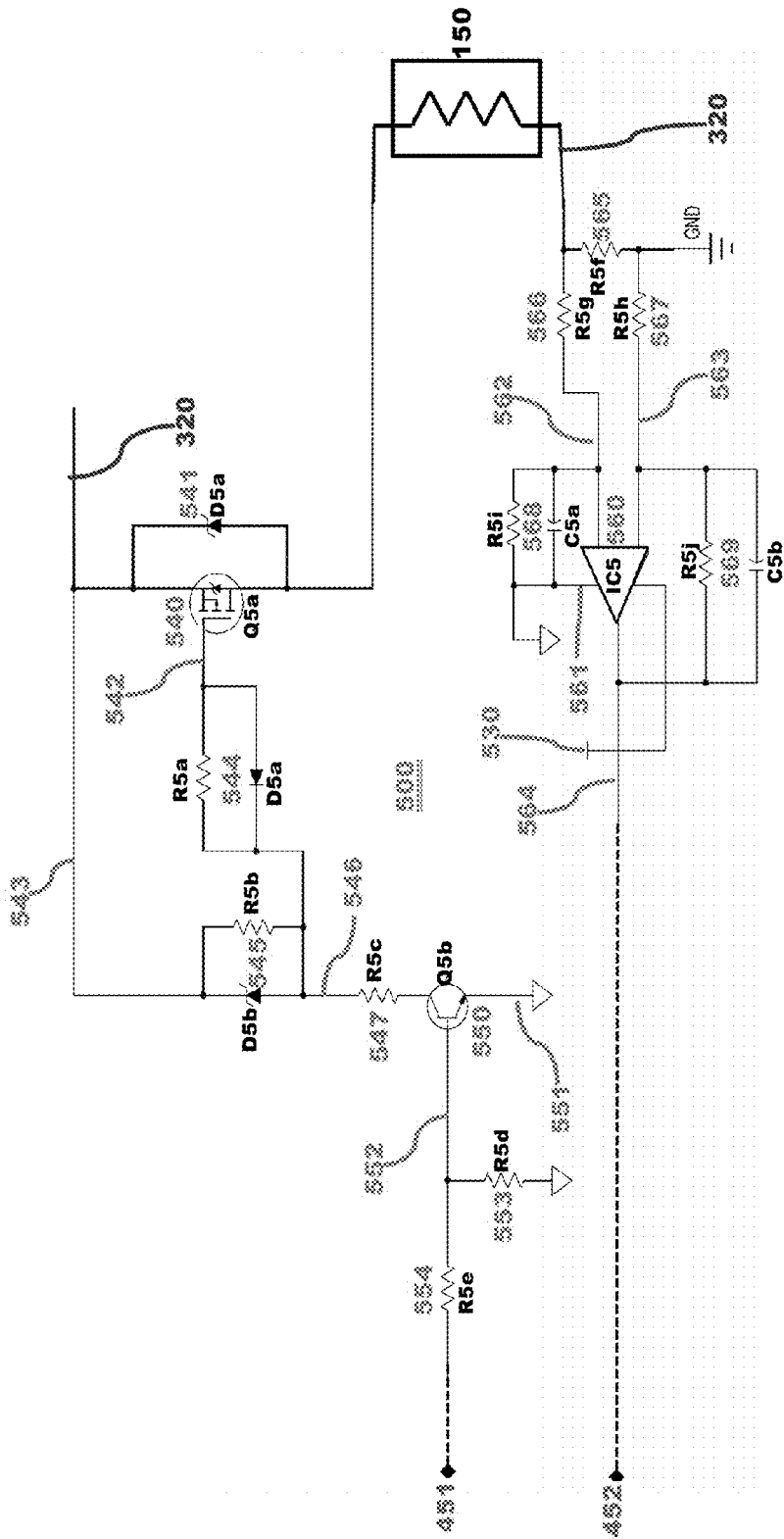
Figure 6:
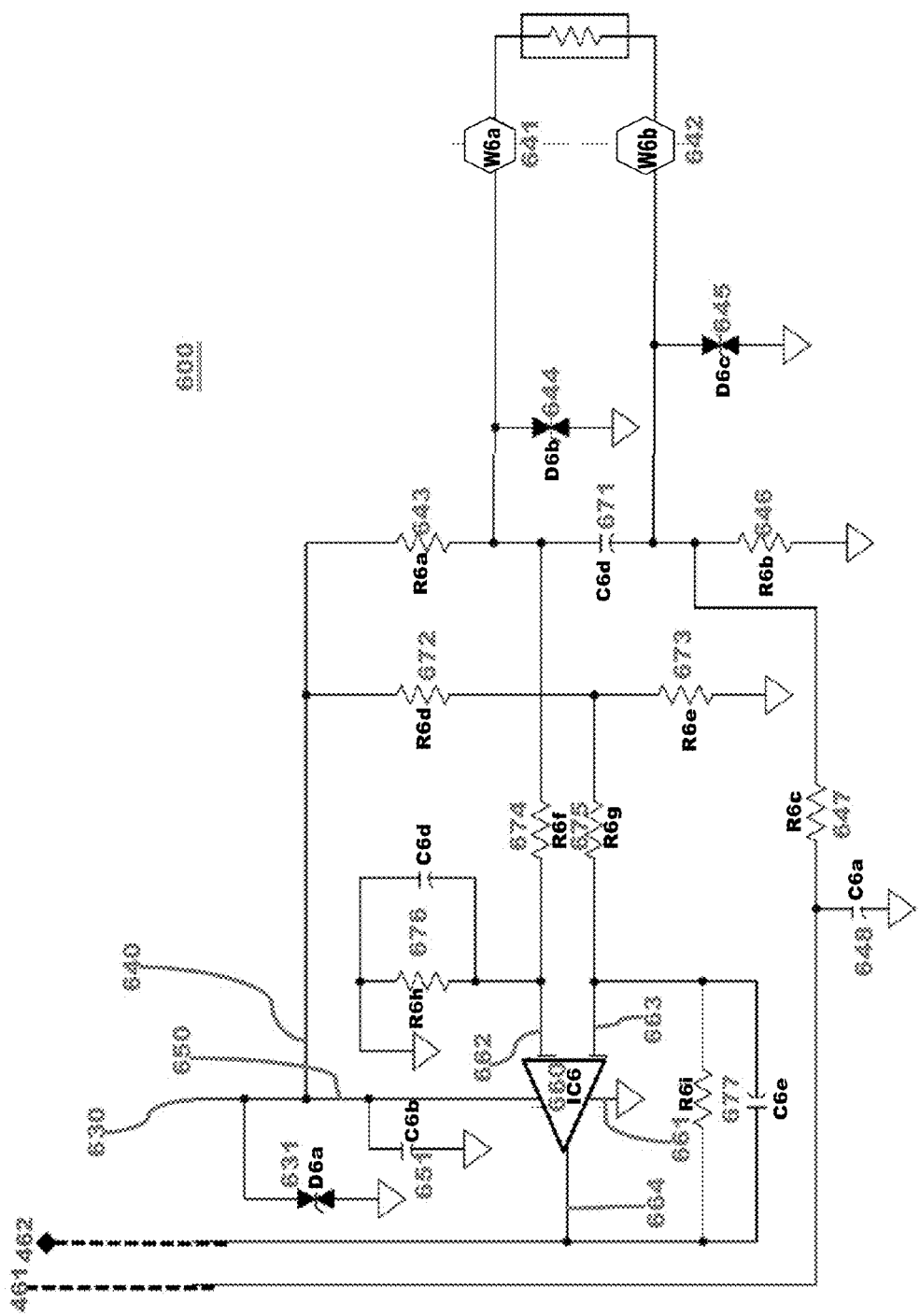
Figure 7:
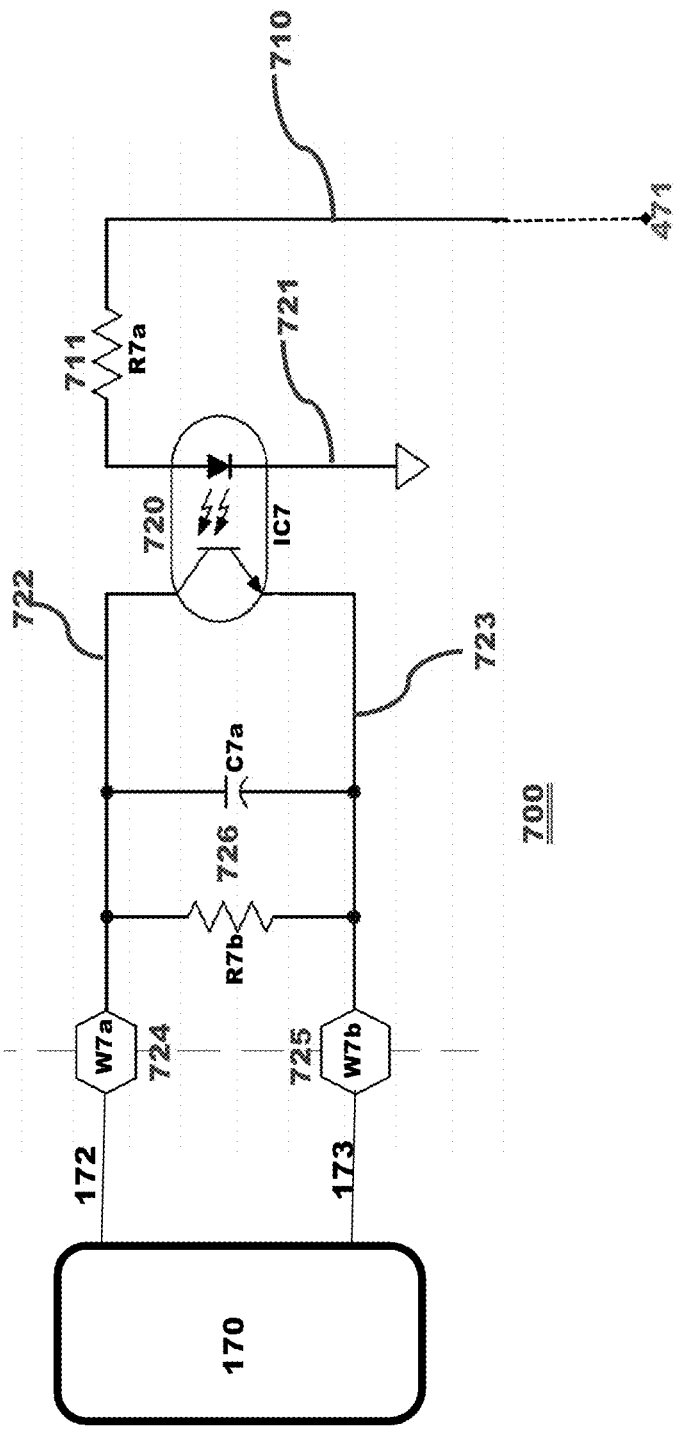
Figure 8:
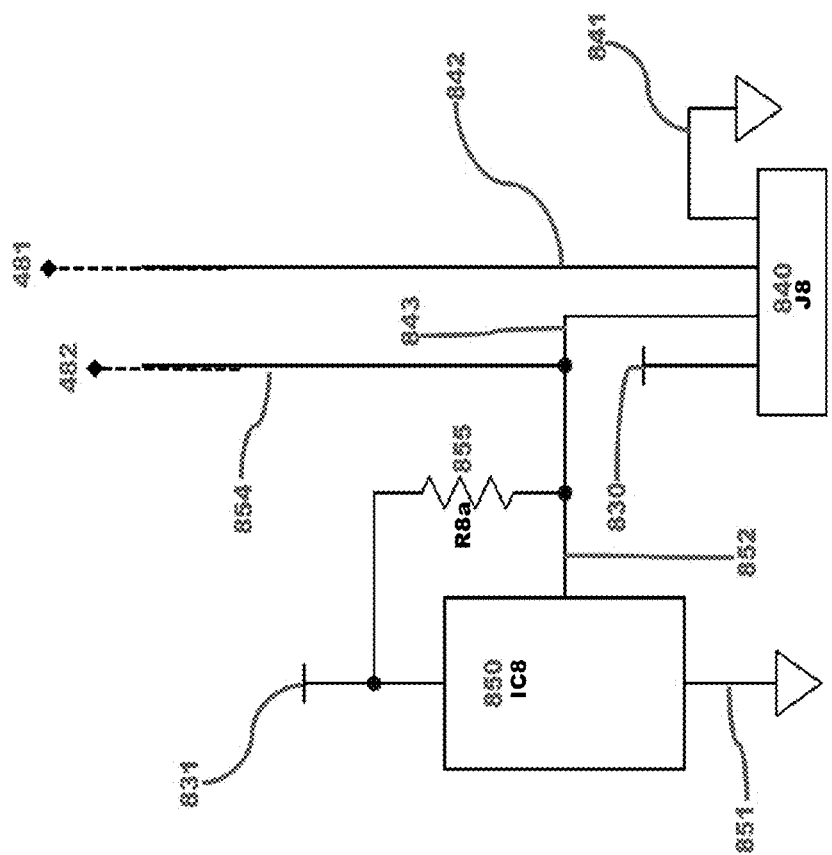
Figure 9:
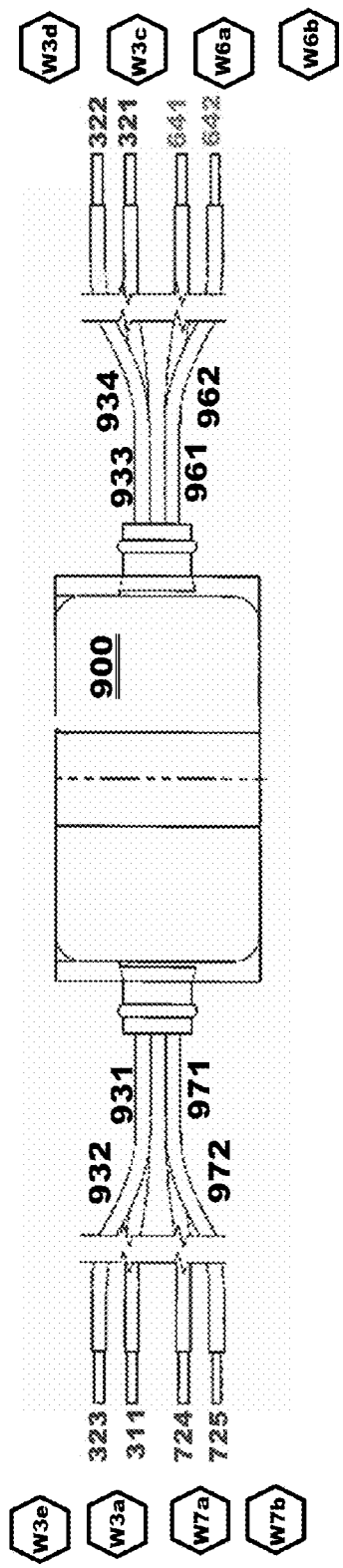
FIG. 9 shows a package integrating the electrical circuit of the aircraft heating system.

Referring now to the drawings, and initially to FIG. 1, an aircraft heating system 100 is shown for heating an aircraft appliance 101. The appliance 101 can comprise, for example, a deicer, a floor panel, a drainmast, a hose, a washing-water dispenser, a hot-beverage maker, or any other aircraft-associated appliance which needs to be heated.

A power source 130 onboard the aircraft supplies DC power to the heating system 100. A small aircraft is commonly equipped with a 28 volt direct current electrical system. Such an electrical system can comprise a DC generator. Alternatively, the DC electrical system can be powered by alternator which stores energy in a battery. In either or any case, the heating system 100 is especially adapted to accommodate an aircraft wherein the heating of the appliance 101 is accomplished with DC power.

The illustrated aircraft heating system 100 comprises a heater 150, a temperature sensor 160, a fault reporter 170, and a setpoint introducer 180.

The heater 150 is positioned to provide heat to or for the aircraft appliance 101. In the illustrated system 100, the heater 150 has an electrothermal design wherein the electrical power is converted to thermal energy via one or more resistance heating elements 151. Electrical power is supplied to the heating element 151 via a supply line 152 and returned via a return line 153.

The sensor 160 is situated to sense a temperature meaningful to the reason the appliance 101 is being heated. To this end, the sensor can reside on the appliance 101, on the heater 150, or in a more relevant surrounding medium. In the illustrated system 100, the sensor 160 comprises a resistance element 161 having an impedance which varies as a function of temperature. Electrical power is supplied to the element 161 via a supply line 162 and returned via a return line 163.

The fault reporter 170 can be located for easy reference, so it may be adjacent to or remote from the heater 150. In some aircraft, for example, the reporter 170 may be best located in the cockpit for inflight consideration by aircraft operators. Additionally or alternatively, it may be located for convenient access by ground personnel between flights. The input bus of the fault reporter 170 can include lines 172-173.

The setpoint introducer 180 allows an introduction or update of temperature-threshold information. As such information is typically not modified during flight; the introducer 180 can be designed to allow selective connection of an input device 190 (e.g., a laptop computer) for data introduction. The heating system 100 can have temperature thresholds input via the introducer 180 prior to aircraft installation and/or after aircraft installation. Additionally or alternatively, the introducer 180 can be used to adjust temperature thresholds between flights.

The aircraft heating system 100 further comprises a thermostat 200 which coordinates and/or controls the heater 150, the temperature sensor 160, the fault reporter 170, and the setpoint introducer 180.

Thermostat 200

FIG. 2

The thermostat 200 comprises power-supplying circuitry 300, processing circuitry 400, heating circuitry 500, temperature-sensing circuitry 600, fault-reporting circuitry 700, and setpoint-introducing circuitry 800.

Generally, the circuitry 300 appropriately ushers power from the DC power source 130 to the heater-system components and other circuitries. The processing circuitry 400 helps oversee overall thermostat operation by sending instructions to and/or receiving information from the other circuitries. The heating circuitry 500 manages power supply to the heater 150 and preferably also detects heater-associated faults. The sensing circuitry 600 conveys temperature information sensed by the sensor 160 and preferably also has sensor-fault-detecting features. The fault-reporting circuitry 700 reports fault-detection data to the reporter 170. And the setpoint-introducing circuitry 800 allows the introduction of temperature-setpoint inputs through the introducer 180.

Power-Supplying Circuitry 300

FIG. 3

The power-supplying circuitry 300 receives power from the onboard source 130 and can include a terminal 311 (W3a) adapted for connection to the supply line 132 of the DC power source 130. A circuit breaker 312 can be interposed between the source supply line 132 and the terminal 311. A ground terminal 313 (W3b) with a voltage regulator (C3a) can be also be associated with the source supply line 132.

The circuitry 300 divides the source supply line 132 into a high-voltage supply line 320 and a low voltage supply line 330.

The primary purpose of the high voltage line 320 is to supply electrical power to the heater 150. To this end, the line 320 is connected in series with the heating element 151 of the heater 150. Specifically, for example, the circuitry 300 can include a terminal 321 (W3c) adapted for connection to the heater supply line 152 and a terminal 322 (W3d) adapted for connection to the heater return line 153.

Heater-power-control components of the heating circuitry 500 (namely a controller 540 introduced below) are connected in series with the line 320 on the heater supply side. Heater-fault-detection components of the heating circuitry (namely a resistance 565, introduced below) are connected in series with the line 320 on the heater return side.

The high-voltage supply line 320 can ground via the return line 133 of the DC power source 130, and a terminal 323 (W3e) can be adapted for this connection. A voltage regulator 324 (C3b) and/or a current regulator 325 (L3a) can be provided in parallel with the terminal 323.

The low-voltage supply line 330 provides operating power to non-heating components of the aircraft system. In the illustrated embodiment, the line 330 is divided into supply line 430 for the processing circuitry 400, supply line 530 for the heating circuitry 500, supply line 630 for the temperature-sensing circuitry 600, and supply line 830 for the setpoint-introducing circuitry 800.

The low-voltage supply line 330 can include a power supervisor 331 (IC3). On the input side of the supervisor 331, the line 330 can include a current regulator 332 (L3b), a reverse-polarity protector 333 (D3a), a power reducer 334 (R3a), an over-voltage protector 335 (D3b), and/or voltage storage 336 (C3c, C3d). On the outlet side of the supervisor 331, the line 330 can include voltage storage 337 (C3e, C3f, C3g) and/or a filter 338 (R3b).

Processing Circuitry 400

FIG. 4

The processing circuitry 400 can comprise a microprocessor 410 to allow it to function as the "brains" of the thermostat 200. The microprocessor 440 can be a commercially available unit with sufficient computing strength and memory. The microprocessor 410 receives its operating power from the low-voltage line 330 of the power-supplying circuitry 300.

The low-voltage supply line 430 is connected to the microprocessor 410 via port 431 and grounds therefrom via port 432. The circuitry 400 can include components to protect and/or optimize microprocessor operation on the input side of port 431. In the illustrated embodiment, these components include an electric-static-discharge protector 433 (D4a), an over-voltage protector 444 (D4b), an energy storage 445 (C4a, C4b), and/or a 446 noise suppressor (C4a, C4b).

The microprocessor 410 provides heating instructions to the heating circuitry 500 based upon temperature data received from the sensing circuitry 600. The microprocessor 410 also receives fault-detection data from the circuitries 500 and 660, and conveys this information to the fault-reporting circuitry 700. The microprocessor 410 can further incorporate temperature-threshold data input through the introducing circuitry 800 into its heating instructions.

To this end, the microprocessor 440 includes a plurality of ports connected to the other thermostat circuitries to send and receive information therebetween and/or thereamong. On-off instructions are sent to the heating circuitry 500 through a port 451 and fault-detection data is received from the heating circuitry through a port 452. A port 461 receives sensed-temperature information from the circuitry 600 and the port 462 receives fault-detection data the circuitry 600. A port 471 sends fault-detection information to the fault-reporting circuitry 700, a port 481 receives temperature setpoints input through the introducing circuitry 800, and a port 482 which coordinates with reset functions of the circuitry 800.

The microprocessor 410 can manage power supply to the heater 150 based upon sensed temperature readings and one or more threshold values. Temperature thresholds can be introduced via the programming circuitry 800 before or after installation of the thermostat 200. Alternatively, thresholds can be pre-programmed into the microprocessor memory, whereby circuitry 800 may not be necessary.

The temperature threshold can represent, for example, of a hot-enough temperature. If the sensed temperature is greater than this temperature, the microprocessor 440 will instruct the heating circuitry 500 to convert to the off condition (or remain in the off condition) whereat heating power is not supplied the heater 150. Otherwise, the microprocessor 440 instructs the heating circuitry 500 to convert to or remain in the on condition whereat heating power supplied to the heater 150.

Heating Circuitry 500

FIG. 5

The heating circuitry 500 comprises a heater controller 540 (Q5a) in series with the high-voltage supply line 320. The controller 540 is convertible between a heating condition, whereat power from the high-voltage supply line 320 flows to the heater 150, and a non-heating condition, whereat heating power does not flow to the heater 150.

The controller 540 is preferably a metal-oxide-semiconductor field effect transistor (MOSFET). The source and the drain of the switching transistor 540 are coupled to the high-voltage line 320, with the drain being adjacent to the heater 150. An over-voltage protector 541 (D5a) can be provided for the controller 540.

The gate of the transistor 540 is coupled to a line 542 and a parallel line 543 is coupled to the source-side. The line 542 can include a quick-turnoff 544 (R5a, D5b). The line 542 and/or the line 543 can include a gate-voltage limiter 545 (R5b, D5c). The lines 542-543 divide from a line 546 which can include current limiter 547 (R5c).

The heating circuitry 500 also comprises an on-off switch 550 (Q5b) which is instructed by the microprocessor 410. The switch 550 is preferably a bipolar transistor (npn) with its collector coupled to the line 546, its emitter coupled to a line 551 to ground, and its base coupled to a line 552. The line 552 is connected to the microprocessor port 451 and it can include a current limiter 553 (R5d) and/or a false-turn-on preventer 554 (R5e).

The switching of the transistor 550 depends upon the output provided by the microprocessor 410 through the port 451. When a relatively elevated output signal is provided, the switch 550 is off and current is routed to ground. Thus, no current flows to the gate of the controller 540 whereby it is converted to, or remains in, its non-heating condition.

When a relatively depressed output signal is provided by the microprocessor 410, the switch 550 is on, and current flows to the gate of the controller 540. The controller 540 is converted to, or remains in, a heating condition whereat power is provided to the heater 150.

The heating circuitry 500 can further comprise fault-detection features which receive operational power from the low-voltage line 530 ushered in by the power supply circuitry 300. These features can include a comparator 550 (IC5) which grounds to line 551, receives input from lines 552-553, and outputs to line 554. Line 554 is coupled to the microprocessor port 542 so as to provide fault-indicative signals thereto. For example, a "too high" signal indicates a short fault in the heater 150, and a "too low" signal indicates an open fault in the heater 150.

The input lines 552-553 divide from high-voltage line 330 between the heater return 153 and ground. Resister 554 (R5*f*) can be situated on the line 330, resister 555 (R5*h*) can be situated on line 552, and resister 556 (R5*j*) can be situated on the lines 551-552. A noise filter 557 (R5*k*, C5*a*) can be arranged with the ground line 551 and the input line 552, and/or a noise filter 558 (R5*l*, C5*b*) can be arranged with the input line 553 and the output line 554.

Temperature-Sensing Circuitry 600

FIG. 6

The temperature-sensing circuitry 600 receives operational power from supply line 630 ushered thereto by the power-supplying circuitry 300. The line 630 can be provided with an electric-static-discharge protector 631 (D6*a*). The supply line 630 splits into a line 640 and a line 650.

The line 640 is coupled in series with the resister 161 of the sensor 160. The circuitry 600 can include a terminal 641 (W6*a*) adapted for connection to the line 162 of the sensor 160 and a terminal 642 (W6*b*) adapted for connection to its line 163. On the output side of the sensor 160, the line 640 returns to the microprocessor port 461 with a voltage indicative of a sensed temperature. A voltage reducer 644 (R6*a*), electric-static-discharge protectors 644-645 (D6*b*-D6*c*), a pull-down resistance 646 (R6*b*), a current reducer 647 (R6*c*), and/or a filter 648 (C6*a*) can be provided in the line 640.

The line 650 can be routed to fault-detection features and can include a filter 651 (C6*b*). In the illustrated embodiment, these features include a comparator 660 which grounds to line 661, receives input from lines 662-663, and outputs to line 664. Line 664 is coupled to the port 462 to deliver fault-indicative information to the microprocessor 410.

The input line 662 represents the reference voltage and the input line 663 represents the voltage across the sensor 160. If the voltage across the sensor 160 is unreasonably low as compared to the reference voltage, this would be indicative of an open fault. If the voltage across the sensor 160 is unreasonably high relative to the reference voltage, this would be indicative of a short fault. The fault-detection features can further comprise appropriate filtering, scaling, and/or gaining components 671-672 (C6*c*-C6*e*, R6*d*-R6*i*).

Fault-Reporting Circuitry 700

FIG. 7

Fault-reporting circuitry 700 comprises a line 710 between the microprocessor port 471 and a signal-transferring device 720 (IC7). A resistance 711 (R7*a*) can be placed on the line 710 on the input side of the device 720. In the illustrated embodiment, the signal device 720 is an opti-isolator having a ground line 721 and an output coupled to a communication bus comprising lines 722-723. The circuitry 700 can include terminals 724-725 (W7*a*-W7*b*) adapted for connection to the lines 172-173 of the reporter 170. A noise filter 726 (C7*a*, R7*b*) can also be provided.

Setpoint-Introducing Circuitry 800

FIG. 8

Setpoint-introducing circuitry 800 receives operating power from the supply lines 830 and 831 ushered to it by the power-supplying circuitry 300. In the illustrated embodiment, the line 830 supplies operating power to a junction 840 (J8) and the line 831 supplies operating power to the resetting device 850 (IC8).

The junction 840 has a ground line 841, an introducing line 842 connected to the microprocessor port 481, and a line 843 associated with the device 850. The junction 840 is adapted for connection to the introducer 180 (e.g., a laptop) so that temperature setpoints may be introduced therethrough and conveyed to the microprocessor 410 through the line 842.

The resetting device 850 has a ground line 851 and an output line 852 connected in parallel with the line 843 to a reset line 854 leading to the microprocessor port 482. A resistance 855 (R8*a*) is arranged in parallel with the device 850 between the supply line 831 and the output line 852. If voltage reaches above a predetermined level, the circuitry 800 is adapted to automatically reset (e.g., reboot) the introducer 180.

Package 900

FIG. 9

The thermostat 200 can be integrated into a package 900 having relatively small dimensions. Specifically, for example, the package size can be less than six cm long, less than four cm wide, and/or less than two cm thick. The package 900 can include a circuit board containing the circuitries 300-800. Heat sinks and/or insulation can be provided in a suitable manner.

Lead lines 931-932 and 977-978 can extend from one end of the package 900, and lead lines 933-934 and 965-966 can extend from its other end for convenient connection to the relevant components of the heating system 100. Specifically, for example, lead lines 931-932 and lead lines 933-934 can connect the power-supplying circuitry 300 to the power source 130 (e.g., terminals 311-312) and the heater 150 (e.g., terminals 321-322). Lead lines 963-964 can electrically connect the sensor 160 to the circuitry 600 (e.g., terminals 641-642). And lead lines 977-978 can electrically connect the fault reporter 170 the circuitry 700 (e.g., terminals 724-725).

Closing

One may now appreciate that the aircraft heating system 100 incorporates solid-state switching equipment, is compatible with a DC power source, can detect/report faults in key components, and is selectively programmable. While the heating system 100, the appliance 101, the power supply 130, the heater 150, the sensor 160, the reporter 170, the introducer 180, the thermostat 200, the circuitries 300-800, and/or the package 900 have been shown and described with respect to a certain embodiment, other equivalent alterations and modifications will occur to others skilled in the art upon the reading and understanding of this disclosure.

The invention claimed is:

1. A thermostat for an aircraft heating system supplied with DC power from an onboard source, said thermostat comprising:

power-supplying circuitry configured to receive, through a source supply line, DC power from an onboard DC power source, the power-supply circuitry configured to divide the source supply line into a high voltage supply line providing heating power and a low voltage supply line providing operational power;

processing circuitry receiving operational power from the low voltage line and formulating instructions relating to the heating power;

heating circuitry controlling supply of the heating power from the high voltage line in accordance with the instructions formulated by the processing circuitry; and sensing circuitry conveying a sensed temperature to the processing circuitry for input when formulating the instructions relating to heating power;

wherein the heating circuitry and/or the sensing circuitry also detect faults and report them to the processing circuitry.

2. A thermostat as set forth in claim 1, wherein the heating circuitry comprises a solid state switch which controls the supply of the heating power from the high voltage line.

3. A thermostat as set forth in claim 2, wherein the solid state switch is connected in series with the high voltage line.

4. A thermostat as set forth in claim 3, wherein the solid state switch is a field effect transistor.

5. A thermostat as set forth in claim 4, wherein the solid state switch is a metal-oxide-semiconductor field effect transistor (MOSFET).

6. A thermostat as set forth in claim 5, wherein the switch converts between a heating condition and a non-heating condition.

7. A thermostat as set forth in claim 1, wherein the heating circuitry comprises a solid-state switch that switches between an on state and off state in response to instructions from the processing circuitry.

8. A thermostat as set forth in claim 7, wherein the on-off switch is a transistor.

9. A thermostat as set forth in the claim 8, wherein the on-off switch is a bipolar transistor.

10. A thermostat as set forth in claim 2, wherein the on-off switch converts another solid state switch between a heating condition and a non-heating condition.

11. A thermostat as set forth in claim 1, wherein the heating circuitry and/or the sensing circuitry receives operational power from the low voltage line.

12. A thermostat as set forth in claim 1, wherein the heating circuitry detects an open fault.

13. A thermostat as set forth in claim 1, wherein the heating circuitry detects a short fault.

14. A thermostat as set forth in claim 1, wherein the sensing circuitry detects an open fault and/or a short fault.

15. A thermostat as set forth in claim 1, further comprising a setpoint-introducing which allows introduction of temperature setpoints to the processing circuitry for use when formulating the instructions relating to heating power.

16. A thermostat as set forth in claim 1, integrated into a package that is less than six cm long, less than four cm wide, and/or less than two cm thick.

17. A thermostat as set forth in claim 16, wherein two pairs of lead lines extend out from end of the package and two pairs of lead lines extend out from the other end of the package.

18. An aircraft heating system comprising:
a heater positioned to provide heat to an aircraft appliance;
a sensor situated to sense a temperature relevant to the aircraft appliance, and
a thermostat as set forth in claim 1, wherein the power-supplying circuitry is to the heater, and wherein the sensing circuitry is coupled to the sensor.

19. An aircraft heating system as set forth in claim 18, further comprising a fault reporter, wherein fault-reporting circuitry of the thermostat conveys fault-relevant data to the reporter.

20. An aircraft heating system as set forth in claim 19, comprising a programmer selectively connectable to the thermostat to introduce and/or update temperature-threshold information to the processing circuitry.

* * * * *